(12) United States Patent
Amsz et al.

(10) Patent No.: US 12,059,950 B2
(45) Date of Patent: Aug. 13, 2024

(54) COMPONENT ASSEMBLY FOR A CRASH ZONE OF A MOTOR VEHICLE

(71) Applicant: Bayerische Motoren Werke Aktiengesellschaft, Munich (DE)

(72) Inventors: Markus Amsz, Bachenhausen (DE); Martin Gamboni, Eurasburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 299 days.

(21) Appl. No.: 17/632,265

(22) PCT Filed: Sep. 4, 2020

(86) PCT No.: PCT/EP2020/074769
§ 371 (c)(1),
(2) Date: Feb. 2, 2022

(87) PCT Pub. No.: WO2021/043983
PCT Pub. Date: Mar. 11, 2021

(65) Prior Publication Data
US 2022/0281305 A1 Sep. 8, 2022

(30) Foreign Application Priority Data
Sep. 5, 2019 (DE) ...................... 10 2019 123 843.9

(51) Int. Cl.
*B60K 1/04* (2019.01)
*B60R 16/02* (2006.01)
(Continued)

(52) U.S. Cl.
CPC ............ *B60K 1/04* (2013.01); *B60R 16/0215* (2013.01); *H01M 50/242* (2021.01); *H01M 50/249* (2021.01); *B60K 2001/0438* (2013.01)

(58) Field of Classification Search
CPC .............. B60K 1/04; B60K 2001/0438; B60Y 2306/01
See application file for complete search history.

(56) References Cited

U.S. PATENT DOCUMENTS 5,476,151 A * 12/1995 Tsuchida .............. B62D 21/152
                                                        180/274
5,844,169 A    12/1998 Uemura et al.
(Continued)

FOREIGN PATENT DOCUMENTS

CN    109689483 A    4/2019
DE    195 05 364 A1  8/1996
(Continued)

OTHER PUBLICATIONS

International Search Report (PCT/ISA/210) issued in PCT Application No. PCT/EP2020/074769 dated Oct. 21, 2020 with English translation (five (5) pages).
(Continued)

*Primary Examiner* — Jason D Shanske
*Assistant Examiner* — James J Triggs
(74) *Attorney, Agent, or Firm* — Crowell & Moring LLP

(57) ABSTRACT

The invention relates to a component assembly for a crash zone (C) of a motor vehicle, comprising a retaining device (11) having at least one retaining element (12), by means of which at least one component (13, 14) is retained. In order to both arrange the at least one component (13, 14) to most advantageously utilise the available installation space and to guarantee an arrangement of said component (13, 14) that is secure against damage, said component is retained by means of of the retaining element (12) in the region of the crash zone (C) of the motor vehicle in a fixed position, wherein the retaining element (12) has at least one flexible region (19, 20) with which the component (13, 14) can be shifted out of (Continued)

the fixed position into an avoidance position in the event of an accident-related application of force.

11 Claims, 2 Drawing Sheets

(51) Int. Cl.
*H01M 50/242* (2021.01)
*H01M 50/249* (2021.01)

(56) References Cited

U.S. PATENT DOCUMENTS

| | | | | |
|---|---|---|---|---|
| 6,386,611 | B1* | 5/2002 | Buchfink | B60R 11/02 |
| | | | | 296/37.16 |
| 8,596,685 | B2 | 12/2013 | Mauduit et al. | |
| 8,616,319 | B2* | 12/2013 | Yokoyama | H01M 50/249 |
| | | | | 180/68.5 |
| 9,517,686 | B1* | 12/2016 | Paramasivam | H01M 50/244 |
| 10,300,788 | B2* | 5/2019 | Nishiumi | B60K 15/03006 |
| 11,247,727 | B2* | 2/2022 | Jones, II | B62D 21/152 |
| 2009/0242298 | A1* | 10/2009 | Guss | B60L 3/0007 |
| | | | | 180/68.5 |
| 2013/0075173 | A1* | 3/2013 | Kato | H01M 50/249 |
| | | | | 180/68.5 |
| 2017/0029034 | A1* | 2/2017 | Faruque | B62D 21/157 |
| 2019/0312247 | A1 | 10/2019 | Hilmann et al. | |
| 2021/0284241 | A1 | 9/2021 | Wirsing et al. | |
| 2022/0281305 | A1* | 9/2022 | Amsz | B60R 16/0215 |

FOREIGN PATENT DOCUMENTS

| | | |
|---|---|---|
| DE | 10 2011 109 464 A1 | 4/2012 |
| DE | 10 2010 054 916 A1 | 6/2012 |
| DE | 10 2018 205 234 B3 | 8/2019 |
| EP | 2 555 277 A1 | 2/2013 |

OTHER PUBLICATIONS

German-language Written Opinion (PCT/ISA/237) issued in PCT Application No. PCT/EP2020/074769 dated Oct. 21, 2020 (four (4) pages).
German-language Search Report issued in German Application No. 10 2019 123 843.9 dated Apr. 23, 2020 with partial English translation (11 pages).
English translation of Chinese-language Office Action issued in Chinese Application No. 202080050903.4 dated Dec. 13, 2023 (5 pages).

* cited by examiner

COMPONENT ASSEMBLY FOR A CRASH ZONE OF A MOTOR VEHICLE

BACKGROUND AND SUMMARY OF THE INVENTION

The invention relates to a component assembly for a crash zone of a motor vehicle.

Increasing safety requirements for various crash events necessitate that a multiplicity of crash zones for absorbing impact energy have to be provided in the volume production of motor vehicles, in particular of passenger motor vehicles. For example, inter alia respective crash zones for various scenarios of side impacts, by means of which the vehicle occupants, on the one hand, but also safety-relevant modules of the motor vehicle, on the other hand, can be correspondingly protected are to be provided in the region of the respective sides of the vehicle. This relates in particular also to electrically operated vehicles of which the energy-store installations/batteries and associated high-voltage components have to be protected to a particular degree.

A crash zone of this type is to be provided, for example, in the floor region of electrically operated motor vehicles so as to protect energy-store installations disposed within the respective rocker panels and below the vehicle floor against damage, for example in the event of a side impact or a bollard impact. In order for a corresponding side impact to be able to be sufficiently absorbed, the respective crash zones have to be accordingly sized. This however leads to installation space having to be provided at another location so as to accommodate electrical construction elements such as lines or the like of the energy-store installation for an electric drive, for example, and to reliably protect them against damage in the event of a crash. In the worst case, corresponding electrical construction elements have to be disposed in an installation space that limits the interior dimensions of the motor vehicle and thus compromises the comfort of the vehicle occupants.

The present invention is thus based on the object of disposing construction elements of the motor vehicle while favorably utilizing the available installation space, on the one hand, and guaranteeing a safe disposal of these construction elements in terms of damage, on the other hand.

This object is achieved according to the invention by a component assembly having the features of the independent claim. Advantageous design embodiments of the invention are the subject matter of the dependent claims.

The component assembly according to the invention comprises a holding installation having at least one holding element by means of which a construction element, for example an electrical construction element such as a line or the like, in the region of a crash zone of the motor vehicle is held in a fixed position. Should an impingement by a force caused by an accident arise in the region of the corresponding crash zone here, the at least one holding element thus has at least one region which is pliable in a targeted manner and by means of which the construction element, when impinged by a force caused by an accident, is relocatable from the fixed position to a diverted position. As a result of the pliable design embodiment of the corresponding region of the holding element it is consequently achieved that the construction element, for example an electrical line, when impinged by a force caused by an accident in the region of the crash zone, in a diverting movement can be relocated in a targeted manner from the fixed position to the diverted position. It is accordingly to be achieved according to the invention that the respective construction element, for example the electrical line, as a result of the impingement by the force caused by the accident is relocated without substantial damage.

The advantage of the component assembly according to the invention thus lies in that corresponding construction elements such as electrical lines, components or modules, or other, for example media-conducting, lines can be disposed in the region of the respective crash zone of the motor vehicle, on the one hand, whereby these construction elements in this instance can divert in a targeted manner from the position thereof fixed by means of the holding element should a deformation of the crash zone arise in this region. A multiplicity of safety-relevant construction elements can thus be accommodated in the corresponding crash zone, this leading to savings in terms of installation space in other regions, for example in the interior of the motor vehicle, on the one hand, but nevertheless enabling an extremely safe and reliable disposal of the respective construction elements in the region of the crash zone, on the other hand.

In a further design embodiment of the invention here it has proven advantageous for the construction element to comprise an electrical component, in particular an electrical line. Electrical components such as lines, power components or the like of this type can specifically be protected in a particularly reliable manner against damage, in particular when these components are configured as high-voltage components.

A further advantageous embodiment of the invention provides that the at least one pliable region is formed by a flexible element. A flexible element of this type can in a particularly simple manner have sufficient stability and stiffness in order for the at least one construction element to be held in the fixed position within the crash zone, on the one hand, and a sufficient pliability so as to be able to be correspondingly relocated in a targeted manner to the diverted position, for example while configuring a bearing location, when impinged by a force caused by an accident, on the other hand.

A further advantageous embodiment of the invention provides that the at least one pliable region is formed by a bearing. A bearing of this type enables an extremely defined bearing location and consequently a relocating movement along which the at least one construction element is relocatable from the fixed position to the diverted position.

It has furthermore proven advantageous for the holding element to have on the motor vehicle a holding region and on the construction element a holding region, a flexurally rigid region being provided between these holding regions, the flexurally rigid region with the facilitation of a respective flexible region being connected to the respective holding region on the motor vehicle and the holding region on the construction element, respectively. A holding element of this type enables a relocating movement of the respective construction element, for example the electrical line, in the manner of a lever or a parallelogram, respectively, between the fixed position and the diverted position. This results in extremely defined positions in terms of the fixed position and the diverted position.

The component assembly according to the invention has proven particularly advantageous in crash zones in the region of the rocker panel of the motor vehicle. For example, electrical lines can be disposed in a particularly favorable manner in the corresponding crash zone between the energy-store installation and the rocker panel of the passenger motor vehicle specifically in these regions.

It has furthermore proven advantageous for the construction element, in the fixed position, in the vehicle transverse direction to at least partially project laterally in relation to a storage housing of an energy-store installation for a drive train of the motor vehicle. The construction element in the diverted position in this instance, when viewed in the vehicle transverse direction, can preferably be disposed so as to overlap the storage housing and to thus be outside the crash zone.

A further advantageous embodiment of the invention provides that a sliding installation, along which at least one component region of the holding element is able to be relocated from the fixed position to the diverted position, is provided. The sliding installation to this end preferably comprises on the motor vehicle a sliding element and on the construction element a sliding element, the sliding elements mutually interacting in such a manner that the construction element can be relocated in a particularly reliable and positionally accurate manner between the fixed position and the diverted position.

Further features of the invention will emerge from the claims, from the figures and from the description of the figures. The features and combinations of features mentioned above in the description, and the features and combinations of features mentioned below in the description of the figures and/or shown in the figures alone, may be used not only in the respectively specified combination but also in other combinations or individually.

The invention will now be explained in more detail by means of a preferred exemplary embodiment and with reference to the drawings.

DETAILED DESCRIPTION OF THE DRAWINGS

Figure 1:
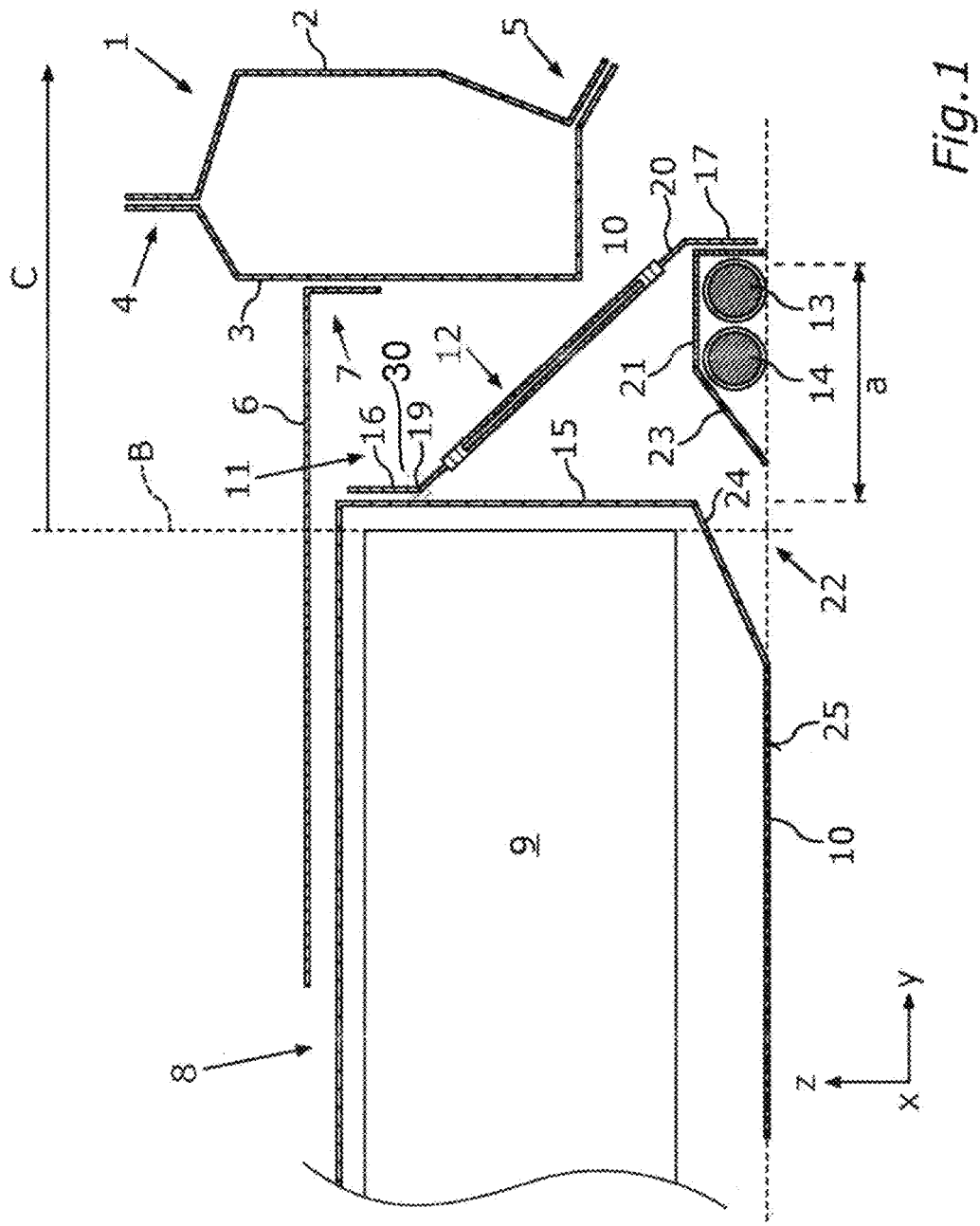
FIG. 1 is a fragmented and schematic sectional view through a component assembly for a crash zone of a motor vehicle, along a section plane extending in the vehicle transverse direction and in the vehicle vertical direction, respectively, having a holding installation with at least one holding element by which a construction element in the form of an electrical line in the region of the crash zone is held in a fixed position between a rocker panel and an energy-store installation disposed inwardly from the latter.

FIG. 1 is a fragmented and schematic sectional view through a component assembly for a crash zone of a motor vehicle, along a section plane extending in the vehicle transverse direction (y-direction) and in the vehicle vertical direction (z-direction), respectively, having a holding installation 11 with at least one holding element by which a construction element in the form of an electrical line 13, 14 in the region of the crash zone is held in a fixed position between a rocker panel 1 and an energy-store installation 8 disposed inwardly from the latter. This rocker panel 1 in the present case is assembled from respective sheet-metal shell elements 2, 3 which, while configuring a box section of the rocker panel 1, are connected to one another at respective flanged connections 4, 5. The rocker panel 1 here extends substantially in the vehicle longitudinal direction (x-direction) and horizontally.

A vehicle floor 6 in the region of a flanged connection 7 is attached toward the inside on the rocker panel 1. An energy-store installation 8 which comprises a multiplicity of battery modules 9 that are received within a storage housing 10 is disposed on the lower side of this vehicle floor 6. The battery modules 9 or other electrical components of the energy-store installation within the storage housing 10 here, when viewed in the vehicle transverse direction (y-direction), extend toward the outside only up to an installation space limit B which lies within the crash zone C. Accordingly, the high-voltage components in terms of the vehicle transverse direction (y-direction) are presently disposed toward the inside of this side-impact protected conceived width for high-voltage components.

It can moreover be seen from FIG. 1 that the storage housing 10 in terms of the vehicle transverse direction (y-direction) is disposed at a lateral spacing "a" so as to be offset rearward in relation to the rocker panel 1, or terminates at a corresponding lateral spacing "a" from the rocker panel 1, respectively. The storage housing 10 in the present exemplary embodiment is configured separately from the vehicle floor 6 and is disposed on the lower side of the latter. In a special embodiment here it would also be conceivable for the vehicle floor 6 to form a sub-shell of the storage housing 10, the sub-shell by way of a respective, in particular gas-tight, connection being connected with a further sub-shell external to the body-in-white, as a result of which the storage housing 10 is formed.

A component assembly, which comprises a holding installation 11 having at least one holding element 12 by means of which in the present exemplary embodiment two construction elements in the form of electrical high-voltage lines and/or media lines for the energy-store installation 8 are disposed, is provided at least substantially in the free space, or the spacing "a", respectively, between the storage housing 10 and the rocker panel 1 in the present case. The two lines 13, 14 here extend substantially in the vehicle longitudinal direction (x-direction) and, at least in the longitudinal region shown here, horizontally. In the present case, a plurality of holding elements 12 of identical construction mode are ideally provided, by means of which the two lines 13, 14 in the present case are fastened to and held on an external wall 15 of the storage housing 10. The attachment of the holding elements 12 would of course also be conceivable on the motor vehicle body-in-white. However, in the present case the particular advantage is derived that the component assembly with the holding installation 11 can be preassembled on the storage housing 10 in this way.

The respective holding element 12 of the holding installation 11 in the present case comprises on the motor vehicle a holding region 16 which, as described above, is fastened to the external wall 15 of the storage housing 10, as well as on the construction element, or on the line, respectively, a holding region 17 which in the present exemplary embodiment is configured so as to be at least substantially flexurally rigid and stable. In terms of the vehicle transverse direction (y-direction) and the vehicle vertical direction (z-direction), a likewise flexurally rigid region 18 extends diagonally, from the inside at the top to the outside at the bottom, between these holding region 16, 17, the flexurally rigid region 18 with the facilitation of a respective pliable region 19, 20 being connected with the respective holding region 16 on the motor vehicle and the holding region 17 on the construction element. In other words, the (transition) regions 19, 20 that are in each case angular between the respective holding regions 16, 17 and the flexurally rigid central region 18 are presently designed in a correspondingly pliable manner.

This pliability of the regions 19, 20 can be established by a corresponding choice of materials, for example. For example, if the respective holding elements 12 are made of plastics material, the holding regions 16, 17 and the flexurally rigid region 18 can be reinforced by corresponding hybrid inserts or the like, for example. It would also be conceivable for a plastics-material part to be designed from plastics materials and/or material regions of variable stiffness or pliability, respectively. A correspondingly targeted pliability is presently achieved as a result of the angular design of the pliable regions 19, 20 so that the holding element 12, in the event of being impinged by a force caused by an accident, as described hereunder, by way of a relocating movement defined in terms of geometry and force can take place from a fixed position of the construction elements or lines 13, 14, respectively, shown here to a diverted position illustrated in FIG. 2.

In an alternative design embodiment, the pliable regions 19, 20 as an alternative to a flexible element, can also be formed by a respective bearing 30, for example a pivot bearing or the like. In the design embodiment of the respective holding element 12 it is however essential that the lines or construction elements 13, 14, respectively, remain in the fixed position thereof shown in FIG. 1 and herein do not excessively vibrate or the like as a result of vibrations, slipstream, etc., for example.

Figure 2:
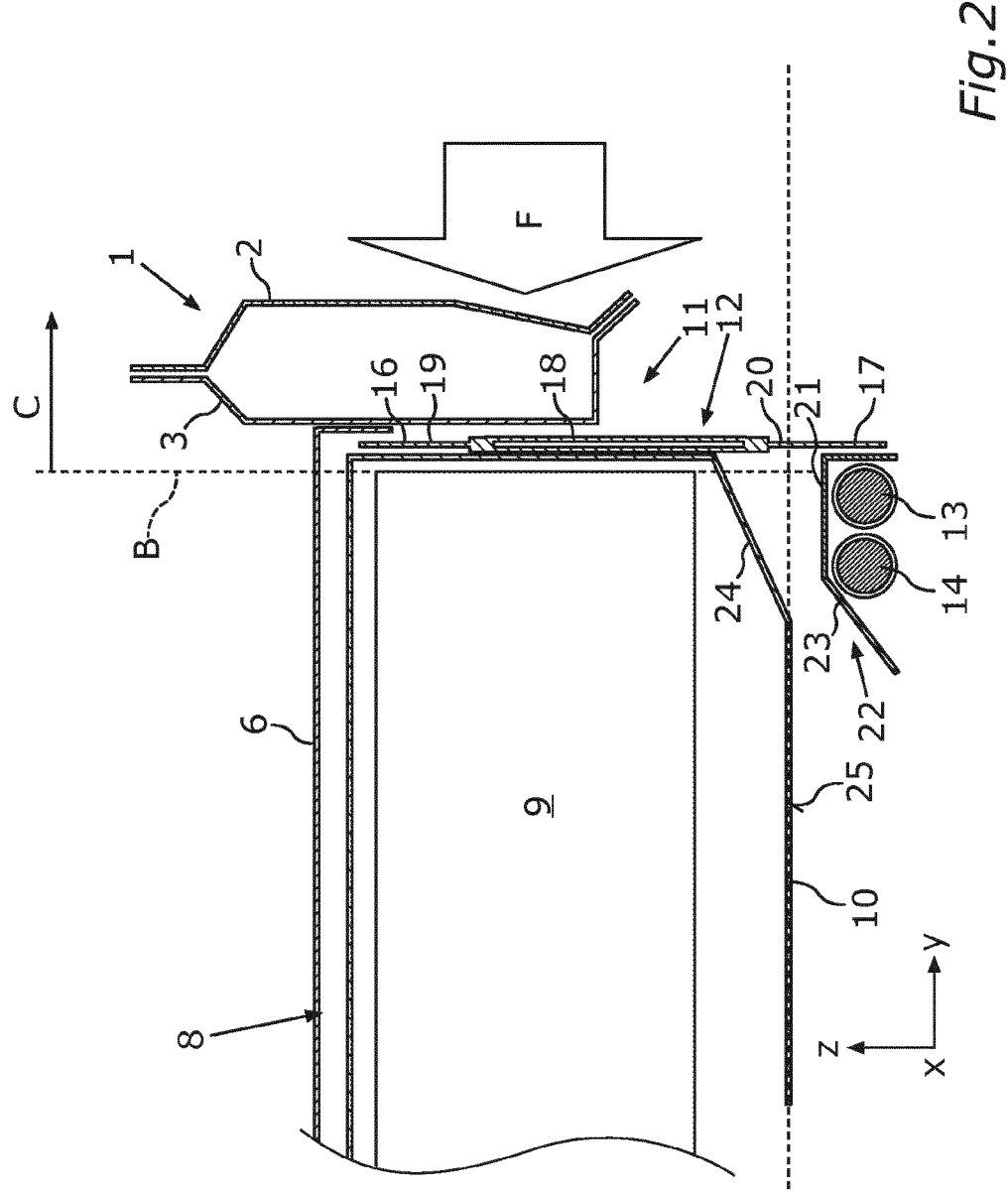
FIG. 2 is a fragmented and schematic sectional view of the component assembly in a manner analogous to that of FIG. 1, wherein the component assembly is shown after an impingement of force caused by an accident as a result of a side impact, as a result of which lines by way of the holding installation have been relocated from the fixed position according to FIG. 1 to a diverted position according to FIG. 2 below the energy-store installation.

FIG. 2 in a further fragmented and schematic sectional view analogous to that of FIG. 1 shows the component assembly of the respective lines or construction elements 13, 14, respectively, in the region of the crash zone C within the rocker panel 1 that in the present case, as a result of a side impact, a bollard impact or the like, has been deformed, and in particular deformed in the vehicle transverse direction (y-direction) while absorbing impact energy. As a result of this deformation of the rocker panel 1 as well as of the vehicle floor 6, a significant part of the crash zone C, or of the corresponding structural components of the motor vehicle body such as, for example, the rocker panels 1, respectively, has been deformed or have invaded this crash zone C, respectively. It can however be clearly seen that no deformation of construction elements, in particular of the energy-store installation 8, has taken place, in particular when viewed in the vehicle transverse direction (y-direction), the construction components being disposed within the installation space limit B extending in the vehicle longitudinal direction (x-direction) or in the vehicle vertical direction (z-direction), respectively, the installation space limit B representing the side-impact-protected conceived width for corresponding high-voltage components or the like. The present deformation rather takes place only in the region of the crash zone C that is disposed outside the installation space limit B.

Since the component assembly of the respective lines 13, 14 is however disposed in the region of this crash zone C, corresponding precautionary measures have to be taken so that the lines 13, 14, without damage and as a result of an impingement by force, are relocated in a targeted manner from the crash zone C to a corresponding diverted position. It can be seen from viewing FIGS. 1 and 2 in combination here that the respective holding element 12 as a result of the impingement by the force caused by the accident—by means of the collision force F—in the present case with the facilitation of the rocker panel 1 has been relocated from the fixed position according to FIG. 1 to the diverted position according to FIG. 2 in such a manner that the lines 13, 14, when viewed in the vehicle transverse direction (y-direction) are now situated at least substantially below the storage housing 10 and the energy-store installation 8 (or at least substantially in the installation space limits B). The targeted relocation of the lines 13, 14, or of the respective holding element 12, respectively, here has been established in that the respective, angular pliable regions 19, 20 have been correspondingly stretched and have an at least substantially rectilinear profile. The pliable regions 19, 20 here extend in an at least substantially rectilinear manner and in the vehicle vertical direction (z-direction). The deformation of the pliable regions 19, 20 here, for example and in particular, can be plastic and thus permanent.

The lines 13, 14 in the present case are received in a receptacle 21 in the form of a cable duct or the like. This cable duct is preferably extremely stable and likewise designed from a flexurally rigid and correspondingly stable material, for example. Provided in the present case here is a sliding installation 22 along which at least one component region of the holding element 12, in the present case the receptacle 21, is able to be relocated from the fixed position to the diverted position. To this end, the sliding installation 22, or the receptacle 21, respectively, has a sliding ramp or a like sliding element 23 on the construction element, the sliding element 23 interacting with a sliding element 24 on the motor vehicle. This sliding element 24 on the motor vehicle is presently disposed on a lower side 25 of the storage housing 10, in a corner region toward the external wall 15, and in the vehicle longitudinal direction (x-direction) extends across an at least significant longitudinal region of the storage housing 10. The sliding ramp or the sliding element 23 on the receptacle 21 or on the cable duct, respectively, in the vehicle longitudinal direction (x-direction) also extends across a significant longitudinal region. Overall, the receptacle 21, or the cable duct, respectively, when impinged by a force caused by an accident and when relocated toward the inside in the vehicle transverse direction (y-direction) can thus be relocated in an extremely reliable and defined manner to the diverted position below the storage housing 10, or within the installation space limit B, respectively.

Overall, the present component assembly thus achieves a possibility for disposing construction elements, for example of high-voltage energy-store installations 8, laterally to the storage housing 10 in the region of the crash zone C, nevertheless guaranteeing in a particularly safe and reliable manner that no damage occurs to these lines 13, 14 or like construction elements in the event of an impingement by a force caused by an accident. The installation space present in the region of the crash zone C can thus be utilized in an optimal manner without any other installation space, for example in the interior of the motor vehicle, having to be utilized to this end. Since there are usually no reliable and sufficiently responsive shutdown systems for a side impact, a bollard impact or the like, the crash zone C can nevertheless be resorted to for accommodating construction elements, for example high-voltage conductor components, as a result of the component assembly according to the invention.

LIST OF REFERENCE SIGNS

1 Rocker panel
2 Sheet-metal shell element
3 Sheet-metal shell element

4 Flanged connection
5 Flanged connection
6 Vehicle floor
7 Flanged connection
8 Energy-store installation
9 Battery module
10 Storage housing
11 Holding installation
12 Holding element
13 Line
14 Line
15 External wall
16 Holding region
17 Holding region
18 Region
19 Pliable region
20 Pliable region
21 Receptacle
22 Sliding installation
23 Sliding element
24 Sliding element
25 Lower side
a Spacing
B Installation space limit
C Crash zone
F Collision force

What is claimed is:

1. A component assembly for a crash zone of a motor vehicle, comprising:
holder having a longitudinal extent extending diagonally downward from a transverse inner side at an upper end to a transverse outer side at a lower end at which at least one construction element in a region of the crash zone of the motor vehicle is held in a fixed position, wherein
the holder has at least one pliable region by which the construction element, when impinged by a force caused by an accident, is relocatable from the fixed position to a diverted position.

2. The component assembly according to claim 1, wherein the construction element comprises an electrical component.

3. The component assembly according to claim 2, wherein the electrical component is an electrical line.

4. The component assembly according to claim 1, wherein the at least one pliable region is formed by a flexible element.

5. The component assembly according to claim 1, wherein the at least one pliable region is formed by a bearing.

6. The component assembly according to claim 1, wherein the crash zone is provided in the region of a rocker panel of the motor vehicle.

7. The component assembly according to claim 6, wherein in the fixed position, the construction element at least partially projects laterally in the vehicle transverse direction in relation to a storage housing of an energy-store installation for a drive train of the motor vehicle.

8. The component assembly according to claim 7, wherein the construction element is able to be relocated from the fixed position in the vehicle transverse direction toward the inside in a transverse direction of the vehicle to the diverted position below the storage housing.

9. The component assembly according to claim 1, wherein a slider guide is provided, along which at least one component region of the holding element holder is able to be relocated from the fixed position to the diverted position, is provided.

10. A component assembly for a crash zone of a motor vehicle, comprising:
a holder by which at least one construction element in a region of the crash zone of the motor vehicle is held in a fixed position, wherein
the holder has at least one pliable region by which the construction element, when impinged by a force caused by an accident, is relocatable from the fixed position to a diverted position, wherein
the holder comprises a first holding region to be held on the motor vehicle or a wall of an energy storage housing, and a second holding region to be held on the construction element, and a flexurally rigid region between the first and second holding regions, and
the flexurally rigid region is connected to at least one of the respective first or second holding regions via a flexible region.

11. A component assembly for a crash zone of a motor vehicle, comprising:
a holder by which at least one construction element in a region of the crash zone of the motor vehicle is held in a fixed position, wherein
the holder has at least one pliable region by which the construction element, when impinged by a force caused by an accident, is relocatable from the fixed position to a diverted position, and
a slider guide is provided, along which at least one component region of the holder is able to be relocated from the fixed position to the diverted position,
the slider guide on the motor vehicle comprises a sliding surface, and on the construction element comprises a corresponding sliding surface that interacts with the sliding surface on the motor vehicle.

* * * * *